(12) United States Patent
Narumiya et al.

(10) Patent No.: US 7,959,755 B2
(45) Date of Patent: Jun. 14, 2011

(54) MANUFACTURE OF THERMAL LAMINATE AND APPARATUS THEREFOR

(75) Inventors: Toshiyuki Narumiya, Osaka (JP); Isamu Asano, Tochigi (JP); Hiroshi Kasahara, Kanagawa (JP); Ryoji Tanaka, Kagawa (JP)

(73) Assignees: Nakamoto Packs Co., Ltd., Osaka (JP); Nissei Chemical Co., Ltd., Kagawa (JP)

( * ) Notice: Subject to any disclaimer, the term of this patent is extended or adjusted under 35 U.S.C. 154(b) by 1133 days.

(21) Appl. No.: 10/832,828

(22) Filed: Apr. 26, 2004

(65) Prior Publication Data
US 2004/0261931 A1    Dec. 30, 2004

(30) Foreign Application Priority Data

Apr. 28, 2003 (JP) ................................ 2003-123036

(51) Int. Cl.
- B32B 37/00    (2006.01)
- B29C 65/00    (2006.01)
- B29C 65/14    (2006.01)

(52) U.S. Cl. ............... 156/272.2; 156/272.4; 156/272.6; 156/272.8

(58) Field of Classification Search ............... 156/272.6, 156/244.17, 272.2, 272.8; 264/448; 438/518
See application file for complete search history.

(56) References Cited

U.S. PATENT DOCUMENTS

| | | | | |
|---|---|---|---|---|
| 3,570,748 A | * | 3/1971 | Coyle et al. | 383/116 |
| 3,850,725 A | * | 11/1974 | Spielau et al. | 156/291 |
| 4,049,904 A | * | 9/1977 | Hori et al. | 174/107 |
| 4,096,013 A | | 6/1978 | Lutzmann et al. | |
| 4,853,287 A | * | 8/1989 | Schirmer | 428/349 |
| 4,956,224 A | * | 9/1990 | Leca | 428/213 |
| 6,117,497 A | * | 9/2000 | Murahara et al. | 427/581 |
| 2002/0048681 A1 | * | 4/2002 | Hidaka et al. | 428/483 |

FOREIGN PATENT DOCUMENTS

| | | | |
|---|---|---|---|
| CH | 507810 | * | 7/1971 |
| DE | 298 23 682 U1 | | 9/1999 |
| DE | 198 26 329 A1 | | 12/1999 |
| DE | 101 49 142 A1 | | 4/2003 |
| EP | 1 031 595 A1 | | 8/2000 |
| JP | 54-137681 | * | 10/1979 |
| JP | 02170883 | * | 7/1990 |
| NL | 7 415 020 A | | 5/1975 |

* cited by examiner

*Primary Examiner* — Justin Fischer

(74) *Attorney, Agent, or Firm* — Flynn, Thiel, Boutell & Tanis, P.C.

(57) ABSTRACT

This invention relates to a method of manufacturing a thermal laminate by laminating a first substrate film layer and a second substrate film layer through an adhesive resin layer, which involves the steps of,

- integrating the adhesive resin layer with the first substrate film layer,
- heating the surface of the adhesive resin layer by heat rays in the presence of oxygen to induce functional groups which contribute to adhesion, and then,
- superimposing the second substrate film layer on the adhesive resin layer to be bonded thereto with pressure. The thermal laminate has a strong laminated strength without using a solvent, and is excellent in the safety and hygiene of foods.

13 Claims, 1 Drawing Sheet

MANUFACTURE OF THERMAL LAMINATE AND APPARATUS THEREFOR

FIELD OF THE INVENTION

This invention relates to a method of manufacturing a packaging material by laminating a first substrate film layer and a second substrate film layer through an adhesive resin layer, and an apparatus therefor.

BACKGROUND OF THE INVENTION

Heretofore, representative methods of laminating a first substrate film layer and a second substrate film layer were extrusion lamination and dry lamination, which are widely utilized now. Extrusion lamination comprises applying an anchor coating (AC) agent, such as an imine-based or urethane-based one, dissolved in a solvent, to the first substrate film layer, followed by drying, and extruding to laminate the second substrate film layer thereon (Masayoshi Araki, "Lamination Processing Handbook", pp 25-32, Kakogijutsu Kenkyu-Kai, 1978). Dry lamination comprises applying an adhesive, such as a urethane adhesive, dissolved in a solvent, to the first substrate film layer, followed by drying, and pressing to laminate the second substrate film layer thereto (ibid. pp 14-18).

On the other hand, as a lamination method without using a solvent, there are the non-solvent lamination of the polyol-isocyanate type and hot-melt lamination. The non-solvent lamination comprises applying a non-solvent reactive type adhesive resin, of which the viscosity has been lowered by heating, to the first substrate film layer, and pressing to laminate the second substrate film layer thereon (ibid. pp 48-49). The hot-melt lamination comprises melting a hot-melt adhesive resin, applying it to the first substrate film layer, and laminating the second substrate film layer thereon (ibid. pp 19-24).

However, in the above extrusion lamination and dry lamination, an organic solvent, such as ethyl acetate, toluene or isopropyl alcohol, is used in a quantity for dissolving the adhesive, and causes noxious odors on working, degradation of working atmosphere and risk of explosion. Furthermore, the organic solvent contaminates the environment around the factory which is forced to move to the suburbs, as well as regulations therefor become severe. The solvent is evaporated resulting in wasting resources. Moreover, unless the solvent is sufficiently evaporated, the odor of the solvent remains in the laminate. Particularly, in the case of using it for food packaging, it is a problem regarding food hygiene.

With respect to extrusion lamination, although the productivity is good due to a fast production speed, the laminated strength of the laminate is inferior to a laminate produced by dry lamination. As a result, it cannot be used as a packaging material for retort foods.

On the other hand, in the case of dry lamination, the laminated strength of the laminate is the strongest, and is used for most of the packaging materials for boiled foods and retort foods. However, the production speed is slow compared with extrusion lamination, and aging of the polyurethane adhesive at 40-70° C. in a temperature controlled room for 2-7 days is necessary for curing, which requires a large place for the temperature controlled room and great energy cost. Moreover, toluene diisocyanate (TD1) used as a curing agent has a risk of being converted into toluene diamine (TDA) which is said to be carcinogenic. In order to avoid this risk, when the curing agent is changed from TD1 to an aliphatic isocyanate having a slow curing rate, uncured polyurethane adhesive resin effuses into retort foods to cause a foreign taste and odor and to be unfavorable in view of food hygiene.

In the above non-solvent lamination and hot-melt lamination, the viscosity of the coating solution must be low for application, and such a restriction of the viscosity restricts the molecular weight of the adhesive resin to be low. As a result, the laminated strength of the laminate becomes much smaller than a laminate manufactured by dry lamination. Then, hot-melt lamination is frequently used for the manufacture of easily peelable materials.

Furthermore, in non-solvent lamination and hot-melt lamination, since the adhesive resin is applied in a molten state, troubles occur on applying, such as solidification.

SUMMARY OF THE INVENTION

As mentioned above, an object of the invention is to solve the problems caused by the solvent used for dissolving the adhesive in extrusion lamination and dry lamination. That is, to solve the problems of noxious odor and health in the working atmosphere, the risk of explosion, environmental pollution, countermeasures against various restrictions, odor of residual solvent, and wasting of resources. Moreover, it is to develop a lamination means not requiring a temperature controlled room, great energy cost and aging time which are required in dry lamination, and to obtain a laminate which is excellent in the safety and hygiene of foods.

Another object of the invention is to develop a lamination means without problems when coating by non-solvent lamination and hot-melt lamination, and capable of obtaining a laminate having a laminated strength stronger than those manufactured by extrusion lamination, non-solvent lamination and hot-melt lamination, and equivalent to dry lamination.

The inventors investigated eagerly as to lamination using an adhesive resin without a solvent in order to achieve the above objects and found that when an adhesive resin layer integrated with a first substrate film layer is heated by heat rays, followed by pressing to laminate a second substrate film layer thereon, the second substrate film layer can be bonded strongly to the first substrate film layer to complete the invention.

Thus, the present invention provides a method of manufacturing a thermal laminate by laminating a first substrate film layer and a second substrate film layer through an adhesive resin layer, which comprises, integrating the adhesive resin layer with the first substrate layer, heating the surface of the adhesive resin layer by heat rays in the presence of oxygen to induce functional groups which contribute to adhesion, and then, superimposing the second substrate film layer on the adhesive resin layer to be bonded thereto with pressure.

In the above method, since the surface of the adhesive resin layer is heated by heat rays in the presence of oxygen, double bond portions in the adhesive resin layer are oxidized by the heating to generate functional groups, such as carboxyl groups, aldehyde groups and hydroxyl groups, which exhibit a strong bonding force. The second substrate film layer is superimposed and pressed to the adhesive resin layer in this state and, accordingly, the second substrate film layer is bonded strongly with the first substrate film layer.

The present invention also provides an apparatus for manufacturing a thermal laminate which comprises, a first delivery means for delivering a laminate of a first substrate film layer and an adhesive resin layer integrated therewith, a second delivery means for delivering a second substrate film layer, a heating means for heating the adhesive resin layer of the laminate delivered from the first delivery means by heat rays, and a bonding means for bonding the second substrate film layer delivered from the second delivery means.

In the above apparatus, the heating means heats the surface of the adhesive resin layer of the laminate delivered from the first delivery means to generate functional groups, such as carboxyl groups, aldehyde groups and hydroxyl groups, which exhibit a strong bonding force. The bonding means presses the second substrate film layer superimposed on the heated adhesive resin layer to bond the second substrate film layer to the first substrate film layer.

Figure 1:
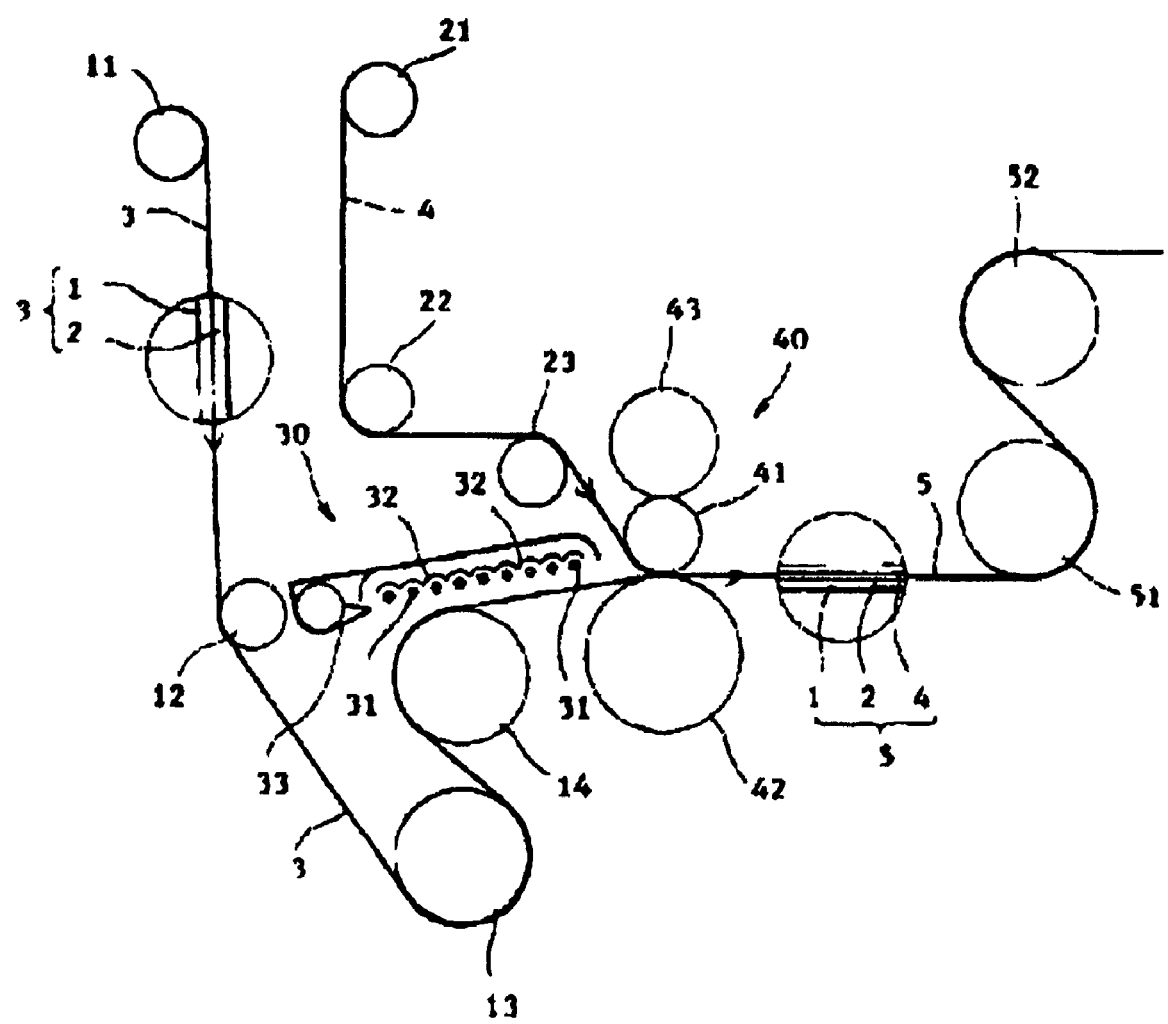
FIG. 1 is a schematic illustration of an apparatus for manufacturing a thermal laminate embodying the invention.

| | |
|---|---|
| 1 | First substrate film layer |
| 2 | Adhesive resin layer |
| 3 | Laminate |
| 4 | Second substrate film layer |
| 5 | Thermal laminate |
| 11 | First delivery roll |
| 12 | Guide roll |
| 13 | Guide roll |
| 14 | Guide roll |
| 21 | Second delivery roll |
| 22 | Guide roll |
| 23 | Guide roll |
| 30 | Heating portion |
| 31 | Infrared heater |
| 32 | Concave reflector |
| 33 | Cooling air nozzle |
| 40 | Bonding means |
| 41 | Nip roll |
| 42 | Heating roll |
| 43 | Back-up roll |
| 51 | Guide roll |
| 52 | Guide roll |

DETAILED DESCRIPTION OF THE INVENTION

The first substrate film layer may be formed of any material capable of laminating with the adhesive resin layer through heating. Since the fundamental resin composing the adhesive resin layer is an ethylene-based resin, the fundamental resin composing the first substrate film layer is bondable with the adhesive resin layer, especially the ethylene-based resin. Preferable resins are olefin-based polymers, particularly ethylene-based polymers such as, low, medium or high density polyethylene resins, L-LDPE resin, ethylene copolymer resins such as ethylene-propylene copolymer resin, ethylene-butene copolymer resin, and the like. The first substrate film layer may be composed of two or more layers and may be a uniaxially or biaxially stretched film as well as unstretched film. A suitable thickness of the first substrate film layer is 10 to 150 µm, preferably 20 to 100 µm.

The adhesive resin layer is formed of an ethylene-based polymer, such as an ethylene homopolymer or copolymer. A preferable ethylene homopolymer is a high-pressure, low-density polyethylene, because of having double bonds and abundant branches which are liable to be oxidized. L-LDPE is also preferred, which is an ethylene copolymer, because of having short branches which are liable to be oxidized. Preferable ethylene copolymers other than L-LDPE are ethylene-unsaturated carboxylic acid anhydride-unsaturated carboxylic acid ester copolymers, ethylene-unsaturated carboxylic acid ester copolymers and ethylene-vinyl ester copolymers. Illustrative of the unsaturated carboxylic acid anhydrides are maleic anhydride, itaconic anhydride, citraconic anhydride and dodecenyl succinic anhydride. Illustrative of the unsaturated carboxylic acid esters are methyl acrylate or methacrylate, ethyl acrylate or methacrylate, propyl acrylate or methacrylate, butyl acrylate or methacrylate, methyl fumarate, ethyl fumarate, propyl fumarate, butyl fumarate, methyl maleate, ethyl maleate, propyl maleate and butyl maleate. Illustrative of vinyl esters are vinyl acetate and vinyl propionate. Two or more comonomers may be combined to produce the ethylene copolymers, and two or more ethylene copolymers may be blended.

The adhesive resin layer preferably has a melting point lower than the first substrate film layer, since the surface of the adhesive resin layer is heated in the integrated state with the first substrate film layer for lamination with the second substrate film layer. When the melting point of the adhesive resin layer is the same as or higher than the melting point of the first substrate film layer, it is necessary to heat the adhesive resin layer up to a high temperature for bonding to induce thermal wrinkling or adhesion to rolls. A suitable melting point of the adhesive resin layer is lower than the first substrate film layer by 10° C. or more, preferably 20° C. or more. For that purpose, it is preferable to use the aforementioned ethylene copolymer resins having a low melting point, especially ethylene-unsaturated carboxylic acid anhydride-unsaturated carboxylic acid ester copolymers, ethylene-unsaturated carboxylic acid ester copolymers and ethylene-vinyl ester copolymers. On the other hand, a too low melting point of the adhesive resin layer is unfavorable because of the heat resistance required as the packaging material cannot be achieved. In this regard, it is preferable that the melting point of the adhesive resin layer is 50° C. or more, preferably 55° C. or more.

As mentioned above, although it is desirable to bond at a low temperature, some packaging materials are required to have a heat resistance capable of resisting heat treatment, such as storage at a high temperature or boiling. In such cases, a preferable means is to blend a polyolefin having a melting point of 100° C. or more to render the melting point of the adhesive resin layer 110° C. or more, preferably 120° C. or more. The blending amount of the polyolefin is 70 wt. % against the weight of the adhesive resin or less, preferably 50 wt. % or less, and 30 wt. % or less and preferably 5 wt. % or more. A blending amount exceeding 70 wt. % is unfavorable because the bonding strength to the second substrate film layer becomes weak. Illustrative of the polyolefins having a melting point of 100° C. or more are high-pressure, low-density polyethylene, linear low-density polyethylene, medium-density polyethylene, high-density polyethylene, polypropylene, poly-4-methyl-1-pentene, etc.

For the improvement in heat resistance, it is also preferable to add a heat-resistant layer formed of a polyolefin having a melting point of 130° C. or more, to arrange the laminate layer construction as a first substrate film layer/heat-resistant layer/adhesive resin layer/second substrate film layer/second substrate film layer. Illustrative of the polyolefin having a melting point of 130° C. or more are high-density polyethylene, polypropylene, poly-4-methyl-1-pentene, etc., and high-density polyethylene is particularly preferred, because of their strong bonding strength to the adhesive resin layer. A suitable thickness of the heat-resistant layer is 1 to 100 µm, preferably 3 to 20 µm.

Another means for improving the heat resistance is to combine an ethylene-copolymer containing an unsaturated carboxylic acid anhydride and a compound having plural hydroxyl groups to induce a crosslinking reaction. The ethylene copolymer has a melting point lower than the first substrate film layer, and includes the aforementioned ethylene-unsaturated carboxylic acid anhydride-unsaturated carboxylic acid ester copolymers. The content of the compound having plural hydroxyl groups is 50 wt. % or less, preferably 30 wt. % or less, and 5 wt. % or more, preferably 10 wt. % or more, for the crosslinking reaction to improve the heat resistance. A content exceeding 50 wt. % is unfavorable because of the degradation of the adhesiveness to the second substrate film layer.

Illustrative of the compounds having plural hydroxyl groups are partially saponified ethylene-vinyl acetate copolymer, ethylene-vinyl alcohol copolymer, polyvinyl alcohol, ethylene glycol, glycerin, 1,4-butanediol, 1,6-hexanediol, 1,8-octanediol, 1,10-decanediol, trimethylolmethane, trimethylolethane, trimethylolpropane, pentaerythritol, diethylene glycol, triethylene glycol, tetraethylene, polyethylene glycol, diglycerin, triglycerin, etc.

Furthermore, by allowing a metal salt to exist therein, the rate of the crosslinking reaction can be raised, and on molding a coextruded film or recycled film, gelation can be inhibited. A suitable content of the metal salt is 20 wt. % or less, preferably 10 wt. % or less, and 0.01 wt. % or more, preferably 0.1 wt. % or more. The excess amount of the metal salt over 20 wt. % does not exhibit the improvement in the acceleration of crosslinking reaction, and nevertheless degrades the strength of the resin. Illustrative of the metal salts are the salts of saturated or unsaturated fatty acids, such as lithium laurate, sodium laurate, calcium laurate, aluminum laurate, potassium myristate, sodium myristate, aluminum myristate, sodium palmitate, zinc palmitate, magnesium palmitate, sodium stearate, potassium stearate, calcium stearate, zinc stearate, sodium oleate, ionomers, etc.

A suitable thickness of the adhesive resin layer is 1 to 40 μm, preferably 2 to 30 μm. Although a thinner thickness of the adhesive resin layer is advantageous in view of cost, when the thickness is thinner than 1 μm, uniform integration is difficult due to coextrudability and coating ability by a die coater.

The integration of the adhesive resin layer with the first substrate film layer may be carried out by the coextrusion of them or by applying the adhesive resin layer to the first substrate film through a die coater.

Subsequently, the surface of the adhesive resin layer of the laminate of the first substrate film layer and the adhesive resin layer integrated with each other is heated rapidly by heat rays in the presence of oxygen. By the heating, the double bonds of the molecules in the adhesive resin layer are cut and oxidized in the presence of oxygen in the air to produce functional groups which contribute to adhesion, such as a carboxyl group (—COOH), its intermediate aldehyde group (—CHO) and hydroxyl group (—OH). The heating degree is at least melting the surface of the adhesive resin layer, i.e. at a temperature of the melting point or higher than that, e.g. the melting point to 10° C. higher than that, preferably higher than the melting point by 20° C. to 50° C. Suitable heating means are infrared heating and flaming.

In the case of infrared heating, infrared rays can be divided into a short wave range (1.0-2.0 μm), medium wave range (2.0-3.5 μm) and long wave range (3.5-5.0 μm), and medium wave range infrared rays are preferable because they are adsorbed efficiently into the adhesive resin layer. In the invention, rapid heating is important to melt only the surface of the adhesive resin layer, and for that purpose, it is effective to concentrate the infrared rays by a concave mirror or the like, preferably to be focused on the surface of the adhesive resin layer. Such a non-contact type radiation heating is effective for raising the manufacturing speed.

In the case of flaming, a conventional flame treatment can be applied, so far as the above conditions can be obtained.

On the other hand, by corona discharge alone, the effects of the invention to improve the laminated strength cannot be obtained, because the melting of the surface of the adhesive resin layer is insufficient.

The heating is conducted in the presence of oxygen. The oxygen may be the oxygen in the air and blowing ozone onto the heated surface of the adhesive resin layer is preferable for increasing the generation of functional groups.

By the heating treatment, the laminated strength with the second substrate film layer is raised by 1 to 12 N/15 mm width, usually 3 to 9 N/15 mm width.

Subsequently, the second substrate film layer is superimposed on the heated adhesive resin layer while it is still hot, and pressed to be bonded thereto.

The second substrate film layer may be formed of any material capable of laminating with the adhesive resin layer, and can be chosen according to the use of the thermal laminate. Illustrative of the second substrate film layers are polyester films, such as PET and PEN, polyolefin films such as high density polyethylene, polypropylene and polybutene, polyamide films, stretched films thereof, metallized films thereof and aluminum foil. Preferred ones are PET, aluminum-deposited PET, oriented polypropylene (OPP), oriented nylon (O—NY) and aluminum foil. The second substrate film layer may be composed of two or more layers. The thickness of the second substrate film layer is 5 to 50 μm, usually 7 to 30 μm.

The first substrate film layer, the adhesive resin layer and the second substrate film layer may contain an antioxidant, lubricant, flame retardant, antiblocking agent, filler, coloring agent and various stabilizers and so on.

Pressing of the superimposed layers may be carried out by nip rolls to bond the second substrate film layer to the adhesive resin layer. A suitable nip pressure is 0.1 to 100 kg-cm, preferably 1 to 50 kg-cm as linear pressure. For the bonding, the nip pressure may be not high, but a suitable pressure is needed for removing the expansion wrinkling.

The thermal laminate in this specification means the laminate formed by the lamination with heating. The thermal laminate thus manufactured can be used as a packaging material for various goods, such as foods and medicines, and are especially suitable as a packaging material for foods to be boiled and for retort foods.

Subsequently, an apparatus for manufacturing the thermal laminate will be explained.

FIG. 1 is a schematic illustration of an apparatus for manufacturing a thermal laminate embodying the invention. In the FIGURE, 11 indicates a first delivery roll as the first delivery means, and delivers a laminate 3 of a first substrate film layer 1 and an adhesive resin layer 2 laminated integrally with each other. 21 indicates a second delivery roll as the second delivery means, and delivers a second substrate film layer 4. 30 indicates a heating portion for heating the surface of the adhesive resin layer 2 of the above laminate 3. 40 indicates the bonding means for bonding the second substrate film layer 4 to the adhesive resin layer 2 with pressure.

12, 13 and 14 indicate guide rolls which guide the laminate 3 to the bonding means through the heating portion 30, and the guide roll 14 is located in the vicinity of the heating portion 30 so as to heat the laminate 3 at the heating portion 30. 22 and 23 are also guide rolls which guide the second substrate film layer 4 to the bonding means 40.

In the heating portion 30, a plurality of infrared heaters 31 are arranged in parallel, perpendicular to the traveling direction of the laminate 3. Each infrared heater 31 is provided with a concave reflector 32, and infrared rays are reflected by the concave reflector 32 and focused on the surface of the adhesive resin layer 2. The infrared heaters 31 are designed to cut off automatically when the apparatus is stopped by troubles or the like.

Cooling air nozzles 33 are provided in the vicinity of the infrared heater 31 arranged at the entrance of the heating portion 30. The cooling air nozzles 33 work, when the infrared heaters 31 are cut off, to blow cooling air to the surface of the adhesive resin layer 2.

A nip roll 41 and a heating roll 42 are provided at the bonding means 40, and they are arranged so that the second substrate film layer 4 meets the heated laminate 3 and presses to bond them strongly while passing therebetween. 43 is a back-up roll for the nip roll 41. 51 and 52 are guide rolls for delivering the thermal laminate 5 formed by bonding the second substrate film layer 4 to the laminate 3 to the next process.

When manufacturing a thermal laminate using the above apparatus, the laminate 3 is delivered from the first delivery roll 11. The laminate 3 passes through the guide rolls 12, 13 and 14, successively, and is heated efficiently and sharply at the heating portion 30 by the infrared rays irradiated directly from the infrared heater 31 and reflected by the concave reflector 32. As a result, functional groups contributing to adhesion are induced efficiently on the adhesive resin layer 2.

On the other hand, the second substrate film layer 4 is delivered from the second delivery roll 21 and conveyed to the bonding means 40 through the guide rolls 22, 23. Then, the second substrate film layer 4 is met with the heated laminate 3 at the nip roll 41 of the bonding means 40 to be superimposed to each other, and pressed by the nip roll 41 and the heating roll 42 to be bonded. As a result, the second substrate film layer 4 is bonded strongly to the first substrate film layer 1 through the adhesive resin layer 2 to form the thermal laminate 5. The thermal laminate 5 is conveyed to the next process by the guide rolls 51, 52, etc.

EXAMPLES

An adhesive resin layer was laminated integrally with a first substrate film layer to form a laminate as follows:

A three layer coextruder composed of a main extruder (90 mmφ) and two sub-extruders (50 mmφ) (manufactured by Modern Machinery Co., Ltd.) was used. Polyethylene resin ("NC574R", Japan Polyolefins Co., Ltd.) was charged into the main extruder and one of the sub-extruders, and an adhesive resin which was polyethylene-maleic anhydride-ethyl acrylate copolymer ("Rexpearl ET 184M", Japan Polyolefins Co., Ltd.) was charged into the other sub-extruder. Then, all the resins were extruded at 240° C. to form a laminate integrally composed of two polyethylene resin film layers as the first substrate film layer 70 μm in thickness 1,000 mm in width and a polyethylene-maleic anhydride-ethyl acrylate copolymer resin layer as the adhesive resin layer 20 μm in thickness and 1,000 mm in width.

Subsequently, a second substrate film layer was laminated to the above laminate composed of the first substrate film layer and the adhesive resin layer to form a thermal laminate. The apparatus used for the manufacture of the thermal laminate was as shown in FIG. 1. The infrared heaters 31 employed were nine medium infrared heaters each with 3.2 KW 1,300 mm in length (Heraeus K.K.). The guide rolls 13 and 14 were heated at 30° C., and the heating roll 42 was heated at 100° C.

Then, the laminate 3 of the first substrate film layer 1 and the adhesive resin layer 2 was delivered from the first delivery roll 11, and the second substrate film layer 4 was delivered from the second delivery roll 21, respectively. The delivery speed of the laminate 3 and the second substrate film layer 4, i.e. the manufacturing speed of the thermal laminate 5, was 150 m/min. The surface temperature of the adhesive resin layer 2 of the laminate 3 was at 500-650° C. upon being heated by the infrared heaters 31, which was measured by a radiation thermometer. The nip pressure at the nip roll 41 was 24 kg-cm as linear pressure.

The production of functional groups, such as —COOH, —CHO and —OH was confirmed by measuring the carbon content and oxygen content of the surface of the adhesive resin layer after heating by the infrared heaters by means of X-ray photoelectron spectroscopy (XPS), and found that the oxygen content after the heating was greatly increased compared with prior to heating. The data are shown in Table 1.

TABLE 1

|  | Before Heating | After Heating | | |
| --- | --- | --- | --- | --- |
|  |  | Side 1 | Center | Side 2 |
| C-content (%) | 97.63 | 90.29 | 90.55 | 91.21 |
| O-content (%) | 2.37 | 9.71 | 9.45 | 8.79 |

As the second substrate film layer 4, three film layers, i.e. polyethylene terephthalate (PET) film 12 μm in thickness, oriented-nylon (O—NY) film 15 μm in thickness, and aluminum-deposited PET film 12 μm in thickness were subjected to the test to produce thermal laminates of three types.

The laminated strength and sealing strength of the three thermal laminates were measured and the results are shown in Table 2.

TABLE 2

|  | PET | O-NY | Al-PET |
| --- | --- | --- | --- |
| Laminated Strength (N/15 mm width) | 7.0 | 7.4 | 6.0 |
| Sealing Strength (N/15 mm width) | 41.1 | 46.7 | 26.4 |

Measurement of Laminated Strength

Each thermal laminate was cut into strips with a width of 15 mm in the traveling direction, and one end was peeled by hand to separate the second substrate film layer from the first substrate film layer. Both ends of the peeled portion were fixed by an upper chuck and a lower chuck of a constant speed pulling tester. The initial distance between the chucks was set 50 mm. The T-peel test was carried out at a speed of 300 mm/min. while keeping the unpeeled portion horizontal and a mean value of 5 times was indicated as the laminated strength.

Measurement of Sealing Strength

Measured According to JIS Z 1707.

The pulling speed was 300 mm/min. and the initial length was 50 mm.

By the above results, it was confirmed that the laminated strength and sealing strength obtained by the invention are identical with or more than laminates manufactured by dry lamination two-component curing type polyurethane adhesives, coating rate: 3.0 g/m² as solid weight, aging at 40° C. for 4 days after lamination, and especially, the laminated strength of the Al-deposited PET film is much greater than that of the laminate manufactured by dry lamination which is 2.0-3.0 N/15 mm width. The laminated strength with the Al-deposited PET film is, in general, not the laminated strength between the first substrate film layer and the second substrate film layer but the peeling strength of the aluminum deposited membrane from the surface of the PET. In the thermal laminate of the invention, it is considered that the deposited strength of aluminum on the PET film is improved.

The thermal laminate thus produced, wherein O—NY was used as the second substrate film layer, was subjected to the effusion test according to Japanese Pharmacopoeia, and UV absorbance (−log T) was measured. In comparison, a laminate (O—NY 15 μm/polyurethane adhesive 3 g/m$^2$/polyethylene 80 μm) manufactured using a polyurethane adhesive containing an aliphatic isocyanate was also measured. The results are shown in Table 3.

TABLE 3

|  | UV absorbance (−log T) | |
| --- | --- | --- |
|  | 220-240 nm | 241-250 nm |
| Thermal Laminate (O-NY 15 μm/Adhesive 20 μm/ PE 70 μm) | 0.03 | 0.01 |
| Polyurethane Laminate (O-NY 15 μm/Polyurethane 3 g/ m$^2$/PE 80 μm) | 0.13 | 0.06 |

The above absorbance was the maximum value in the above wave length range.
Measurement of UV Absorbance
Measured According to Japanese Pharmacopoeia, 13 th Revision.

That is, the thermal laminate and the polyurethane adhesive laminate were made into bags (inside area: 600 cm$^2$), and 200 ml of distilled water was put into each bag followed by sealing. Then, extraction was carried out at 70° C. for 24 hours, and the UV absorbance of the distilled water was measured.

As can be seen from the above results, the UV absorbance of the distilled water packed in the thermal laminate bag was much smaller than that of the urethane adhesive laminate bag, and this indicates that quantity of organic materials extracted from the thermal laminate was much less than that from the polyurethane adhesive laminate. Thus, it was confirmed that the thermal laminate of the invention is safer than conventional polyurethane adhesive laminates in view of food hygiene, and that the foreign taste and odor transferred to the packaged food is small. In the case of the polyurethane adhesive laminate, it is considered that uncured polyurethane, residual solvent, etc. effuse through the polyethylene layer.

The invention claimed is:

1. A method of manufacturing a thermal laminate by laminating an ethylene-based polymer film layer with a second substrate film layer through an adhesive resin layer without the use of a solvent, which comprises the steps of:
providing an adhesive resin layer which forms functional groups at a surface thereof by infrared heating;
integrating the adhesive resin layer with the ethylene-based polymer film layer;
heating the adhesive resin layer with infrared rays in the presence of oxygen to form functional groups on the surface of the adhesive resin layer which contribute to adhesion;
superimposing the second substrate film layer on the adhesive resin layer so that the second substrate film layer is directly in contact with the adhesive resin layer; and
bonding the second substrate film layer to the adhesive resin layer through the application of pressure,
wherein the adhesive resin layer is an ethylene-unsaturated carboxylic acid anhydride-unsaturated carboxylic acid ester copolymer and the second substrate film layer is a polyester or polyamide film or an aluminum foil and the heating of the adhesive resin layer with infrared rays is the sole heating step.

2. The method of claim 1, wherein the infrared rays are medium infrared rays.

3. The method of claim 2, wherein the medium infrared rays are concentrated.

4. The method of claim 3, wherein the medium infrared rays are focused on the surface of the adhesive resin layer.

5. The method of claim 1, wherein the functional groups are at least one member selected from the group consisting of carboxyl groups, aldehyde groups and hydroxyl groups.

6. The method of claim 1, wherein the thermal laminate has a laminated strength of 3-9 N/15 mm width.

7. The method of claim 1, wherein the adhesive resin is heated with the infrared rays to a temperature of at least 500° C.

8. A method of manufacturing a thermal laminate by laminating a first substrate film layer with a second substrate film layer through an adhesive resin layer without the use of a solvent, which comprises the steps of:
providing an adhesive resin layer comprising a combination of a first polyolefin resin which is an ethylene-unsaturated carboxylic acid anhydride-unsaturated carboxylic acid ester copolymer, and a second polyolefin resin having a melting point of 100° C. or more, the content of the second polyolefin resin being no more than 70 wt. %, and which forms functional groups at a surface thereof by infrared heating;
integrating the adhesive resin layer with the first substrate film layer;
heating the adhesive resin layer with infrared rays in the presence of oxygen to form functional groups on the surface of the adhesive resin layer which contribute to adhesion;
superimposing the second substrate film layer on the adhesive resin layer so that the second substrate film layer is directly in contact with the adhesive resin layer; and
bonding the second substrate film layer to the adhesive resin layer through the application of pressure,
wherein the second substrate film layer is a polyester or polyamide film or an aluminum foil and the heating of the adhesive resin layer with infrared rays is the sole heating step.

9. The method of claim 8, wherein the thermal laminate has a laminated strength of 3-9 N/15 mm width.

10. The method of claim 8, wherein the adhesive resin is heated with the infrared rays to a temperature of at least 500° C.

11. A method of manufacturing a thermal laminate by laminating a first substrate film layer with a second substrate film layer through an adhesive resin layer without the use of a solvent, which comprises the steps of:
providing an adhesive resin layer which forms functional groups which are at least one member selected from the group consisting of carboxyl groups, aldehyde groups and hydroxyl groups at a surface thereof by infrared heating;

integrating the adhesive resin layer with the first substrate film layer;

heating the adhesive resin layer with infrared rays in the presence of oxygen to form the functional groups on the surface of the adhesive resin layer which contribute to adhesion;

superimposing the second substrate film layer on the adhesive resin layer so that the second substrate film layer is directly in contact with the adhesive resin layer; and bonding the second substrate film layer to the adhesive resin layer through the application of pressure, wherein the adhesive resin layer is an ethylene-unsaturated carboxylic acid anhydride-unsaturated carboxylic acid ester copolymer and the second substrate film layer is a polyester or polyamide film or an aluminum foil and the heating of the adhesive resin layer with infrared rays is the sole heating step.

12. The method of claim 11, wherein the thermal laminate has a laminated strength of 3-9 N/15 mm width.

13. The method of claim 11, wherein the adhesive resin is heated with the infrared rays to a temperature of at least 500° C.

* * * * *